Figure 1:
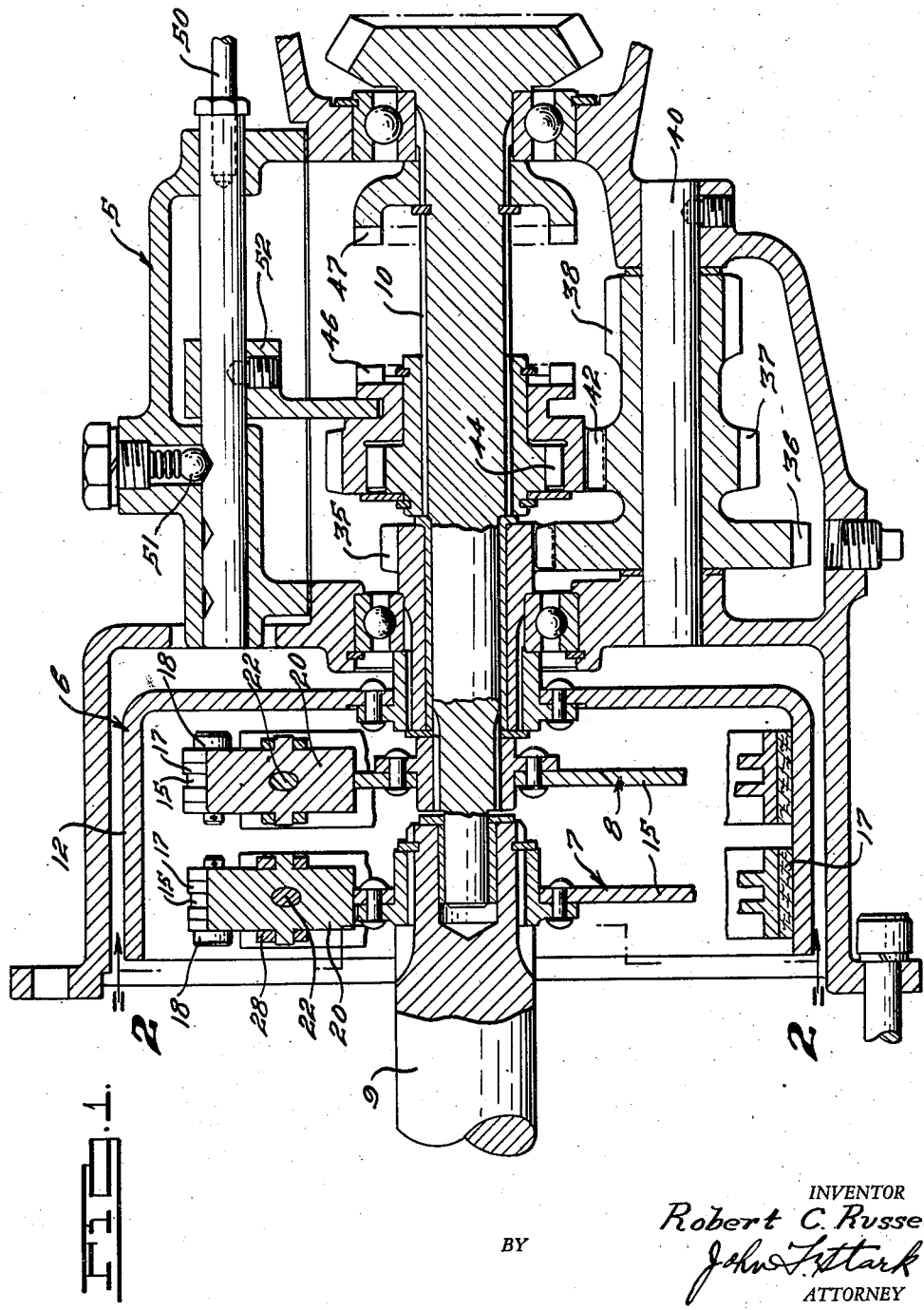

Jan. 15, 1946.   R. C. RUSSELL   2,392,950
AUTOMATIC TRANSMISSION
Filed April 23, 1943   2 Sheets-Sheet 2

INVENTOR
Robert C. Russell
BY John F. Stark
ATTORNEY

Patented Jan. 15, 1946

2,392,950

UNITED STATES PATENT OFFICE 2,392,950

AUTOMATIC TRANSMISSION

Robert C. Russell, Cleveland Heights, Ohio, assignor to Eaton Manufacturing Company, Cleveland, Ohio, a corporation of Ohio Application April 23, 1943, Serial No. 484,177

9 Claims. (Cl. 192—105)

This invention relates to clutch means in general, and, more particularly, concerns a clutch having centrifugally displaceable means, engagable with a torque-transmitting drum for automatic operation of an associated transmission mechanism as used in various types of automotive vehicles and the like.

Clutch means in general and even conventional centrifugal clutch means have been used, heretofore, for operation of an associated planetary gear transmission in two or more speed ratios; however, insofar as applicant is aware, no one has taught the use of a centrifugal clutch means of the type hereindisclosed to effect operation of the said transmission in the novel manner to be described. In the past various centrifugal clutch means have been used to effect different speed ratios in the associated multi-speed transmission arranged to transmit torque imparted thereto, by the displaced masses of one or more of the centrifugally actuated clutches, for effecting one or more speed change ratios in the transmission, but each has had in general certain drawbacks relating principally to the correlation of the centrifugally operated clutches with respect to each other and the associated parts of the cooperable transmission. That is to say, there has been a tendency for the clutches to resist one another in effecting one or more of the speed change ratios automatically; or the variation between engaged and disengaged position of the centrifugally actuated clutches was so critical as to enable the vehicle operator to cause continual slipping of the engine driven or transmission driven clutch until the particular drive condition was completed. The present invention has overcome these shortcomings in a very novel and most simplified manner by proper spacing of the engaged and disengaged positions of each of the centrifugal clutches according to the speed of rotation of the engine and/or the driven shaft speed. Such continued engagement, below the normal R. P. M. necessary to maintain engagement, has a definite advantage because as the drive or driven shaft slows down to a predetermined speed below that necessary for clutch engagement the clutch still remains engaged, since the centrifugal weights have a more powerful resistance to displacement back to their original position from the extended radial position, than they had in starting toward said engaged position, and, therefore, the actuating shaft must necessarily slow down well below the predetermined engaging speed before the clutch disengages and returns to rest in its initial position.

Accordingly, to this end, among the objects of the present invention is the provision in a pair of centrifugally actuated clutches, arranged to automatically operate an associated two-speed transmission, of centrifugally displaceable means radially movable and operably connected to pivotal lever arms and to friction means, one of said pivotal arms having means retarding the return of said friction clutch means to initial position once having assumed a centrifugally displaced position; the provision in a centrifugal clutch means as described above of resilient means associated with each of said centrifugally displaceable weights for providing a continuous outward pressure of the friction clutch means on the clutch torque-transmitting housing to automatically compensate for wear therein immediately upon actuation of the weights; the provision of means in a centrifugal clutch as described of limiting stop means to resist more than a predetermined dynamically balanced radial displacement of each of the centrifugal displaceable weights without affecting subsequent centrifugal engagement of the friction means by pressure adjustable spring-pressed means constantly urging the clutch into engaged position at a selected mechanical advantage or pressure; and the provision in a pair of centrifugally actuable clutches as described of predetermined centrifugally displaceable counterweight means to effect engagement or disengagement at differentially selected speeds according to predetermined operating conditions as desired.

Further and other objects and advantages of the present invention reside in the novel combination and arrangement of parts about to be described, when considered in light of the drawings forming a part of this specification, and which are more particularly pointed out in the appended claims.

Figure 2:
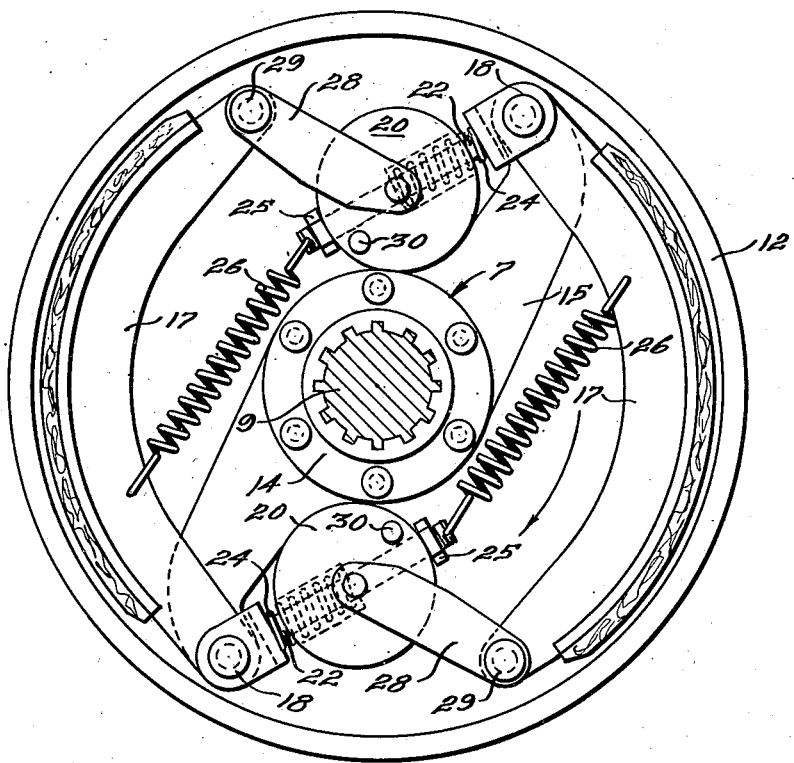
Figure 3:
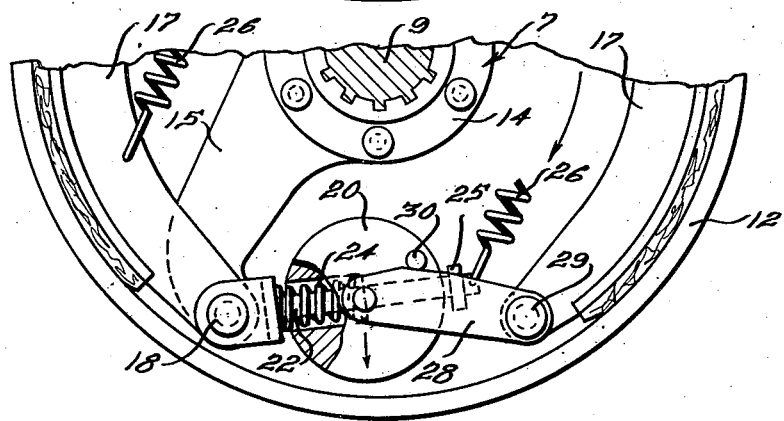

In the drawings like reference characters refer to corresponding parts throughout the several views, and in which:

Fig. 1 is a vertical sectional view through a combination dual centrifugally actuated clutch means and bell housing associated with a two-speed transmission automatically operated thereby, according to the teaching of this invention; and Fig. 2 is an elevational view of one of the centrifugally actuable clutches shown in Fig. 1, illustrating the genus of the invention, and taken substantially on the line 2—2 thereof; and Fig. 3 is an elevational view of a portion of the clutch shown in Fig. 2 but illustrating one of the centrifugally displaceable counterweights in its displaced position.

A principal application of the genus of this invention is its especial utility in the automatic operation of a two-speed transmission associated therewith and operated thereby, such as shown in the vertical sectional view of Fig. 1. In this disclosure the transmission is denoted generally by the reference character 5, and the associated clutch by reference character 6, with a pair of centrifugally actuable engine-driven and transmission-driven clutches therein at 7 and 8, respectively. An input or engine-driven shaft 9 has the engine driven clutch 7 suitably splined thereto and contains an outer counterbored end to freely journal one end of an output or main driven shaft 10 of the transmission to which is splined the transmission driven clutch 8. An annular torque transmitting clutch drum 12 is keyed to a sleeve freely journalled on the driven shaft 10, for operation of the transmission 5 in a manner to be hereinafter described.

Now having reference to Figs. 2 and 3 there is shown a preferred embodiment of a centrifugally actuable clutch illustrating the genus of this invention. The clutch shown may be either the engine-driven clutch 7 or the transmission-driven clutch 8 previously referred to, since the principle of operation and construction are identical, the only difference being either in the value or size of the centrifugally displaceable counterweights and/or the adjustable spring resistance to displacement and return thereof, and which are selectively predetermined to secure desired operating conditions. Accordingly, for purposes of illustration, the engine-driven clutch 7 is shown as consisting of an internally splined hub portion 14 to which is suitably riveted, as shown, a driving member or spider 15 having diametrically disposed arms for pivotally anchoring diametrically opposed ends of each of a pair of clutch shoes or friction means 17 by means of clevis pins 18 to position the same adjacent to the torque-transmitting clutch drum 12.

Disposed in an initial or at-rest position adjacent opposed central portions of the arms of the spider 15 are nested a pair of centrifugally displaceable means or counterweights 20 of a selected size or value. A radially disposed counterbored opening in the weights is adapted to receive a rod 22 having a yoked outer end pivotally secured to the friction elements at the anchored ends thereof by the clevis pins 18, said rod being biased or spring-pressed outwardly by a coiled spring 24 in the counterbore of each of the weights 20 and adapted to be variably loaded by a nut 25 threaded on the opposite end of the rod 22. A retractible spring 26 is also hooked through the end of rod 22 and to a remote part of the clutch shoe or friction means 17, to assist disengagement of the same from the drum 12, and to offer selected resistance to centrifugal displacement of the counterweights at predetermined speeds, of the driving shaft 9. Also pivotally secured axially upon opposite faces of the counterweights 20, or straddling the same, are short lever arms 28 extended to the adjacent free ends of the friction elements 17 where they are pivotally attached thereto by other clevis pins 29. Lugs or pin means 30 integral with or extended from the face of the weights 20 are arranged to abut against the lever arms 28, after predetermined outward movement of the weights, to limit further advancement thereof under the influence of increased centrifugal forces which may act thereon, as best shown in Fig. 3. It will be noted in this limiting position of the stop means that the adjustable nut 25 is spaced from the weight 20 so that the spring 24 is free to exert a drum-engaging pressure on the free end of the friction element. The rods 22 and lever arms 28 jointed at their inner ends by the centrifugally displaceable weights 20 may be conveniently referred to as toggle lever means, wherein the weight 20 at the "knee" of the toggle levers, upon being displaced by centrifugal forces, tends to straighten the arrangement and the parts jointed to the ends of the levers will experience an endwise pressure which increases indefinitely as the levers approach a straight-line position.

From the foregoing constructional details it will now be apparent that the centrifugally displaceable means or counterweights 20, acted upon and forced radially outward under the influence of centrifugal force developed by the speed of the clutch 7 splined to the engine-driven shaft 9, are selected as to weight value so as to be influenced by said centrifugal force proportional to a given engine R. P. M. The spring 26 is of a selected load value to resist outward displacement of the counterweights 20 except when a predetermined amount of centrifugal force is developed, that is to say at a given speed of the drive shaft 9, and incidentally also to assist in a return or pull-back of the weights upon a predetermined decrease below such speed and concurrently the centrifugal force. To insure a uniform clutch-engaged pressure with the drum 12, and to prevent undesirable riding of the weights 20 past center, the limiting or stop pins 30 on the centrifugal weights will abut against the lever arms 28 in such a manner as to insure dynamic balance.

The important function of preloaded spring 24 is to control the predetermined engagement and disengagement of friction member 17 with drum 12. In operation weight 20, under centrifugal force, moves outwardly pivoting the adjacent movable end of friction member 17 toward engagement with drum 12. Before engagement, the drum and friction members rotate at relatively different speeds, and as the friction surfaces engage, slippage occurs until sufficient predetermined centrifugal force has been generated to further compress spring 24 and thereby make substantially solid contact between drum 12 and friction member 17. The members will not disengage until the weight 20, under a centrifugal force less than that required for engagement, again contacts nut 25. The disengagement obviously is at a speed lower than the engaging speed due to the force exerted upon the free end of the friction element by spring 24 through the medium of the weight 20 and lever 28 when the element is in fully engaged position. Hence engagement and disengagement of the friction elements and the drum is more positive between selected upper and lower speeds and slippage is reduced to a minimum.

Now having reference to the transmission driven centrifugally actuable clutch 8, it will be apparent that by a suitable selection of counterweights 20, of different weight or mass value and likewise utilizing a spring 26 of selected load, the counterweights may be caused to effect engagement and disengagement of the friction means with the drum at any predetermined higher or lower R. P. M. of the driven shaft 10, with respect to the drive shaft 9 and clutch 7, so as to provide a minimum of slippage between engaging or disengaging positions of each clutch at its selected R. P. M. and prevent interference of operation of one clutch with respect to the other.

Now having reference to Fig. 1 again, the application of the centrifugal clutches 7 and 8 to effect automatic operation of the associated transmission 5 will be described. Since it is now apparent the engine driven clutch 7 will be engaged with the torque-transmitting drum 12 at a selected engine R. P. M., the drum will in turn rotate a main drive gear 35, which is formed on the end of a sleeve freely journalled on the driven shaft 10, to which the drum is also keyed. Meshed with the gear 35 is gear cluster 36, 37, and 38 journalled upon a rotatable countershaft 40. From the gear 36 power is transmitted through gear 37 to gear 42 which forms one element of overrunning clutch 44 that is slidably keyed to driven shaft 10. Therefore by reason of the gearing as described output torque through the driven shaft 10 may be several times greater than engine torque, depending upon the relative pitch diameters of the gears.

The transmission driven clutch 8, as aforementioned, is splined on the driven shaft 10, and is also arranged to centrifugally engage the drum 12 in the same manner as clutch 7, when the driven shaft exceeds a predetermined speed above the engagement speed of the engine-driven clutch. When this occurs the drive is direct, i. e. one to one, from the drive shaft 9, through clutch 7, drum 12 and clutch 8. While in direct drive shafts 9 and 10 and also main drive gear 35 rotate at the same speed, whereas gear 42 is allowed to rotate at a somewhat slower speed by reason of the over-running clutch 44. For example, say the engine driven clutch 7 is designed to engage at 800 R. P. M. and disengage at 600 R. P. M. Torque is transmitted through drum 12 then a gear reduction of approximately 2.79 to the driven shaft 10 on which the transmission driven clutch 8 is splined. If the transmission-driven clutch is set to engage at approximately 850 R. P. M. of the driven shaft and disengage at 650 R. P. M., when the transmission clutch engages the drum 12 is being driven at approximately 2370 R. P. M. by the engine clutch, by reason of the gear reduction, and the transmission clutch 8 revolving at 850 R. P. M. is picked up by the drum, revolving at 2370 R. P. M., with a short period of slip. It becomes apparent that the transmission clutch will remain engaged now, in high, until the engine speed has been reduced below the transmission clutch disengaging speed of 650 R. P. M. The advantage and result of this action is apparent, that is, of the transmission clutch remaining in engagement when the driven shaft speed is reduced a selected amount below disengaging speed, since the counterweights 20 and clutch packing springs 24 are more effective and the weights more powerful at their extended radial position, under centrifugal force, than they were in starting toward engaged position and therefore it requires the actuating or driving shaft 9 to slow down a given amount below the predetermined engaging speed before the clutch disengages and comes to rest in initial position on the spider arms.

To obtain reverse rotation of the driven shaft 10, when the engine driven shaft 9 is revolving below 800 R. P. M., both clutches 7 and 8 are disengaged and no torque is being transmitted. Therefore the shiftable gear 42, on the overrunning clutch 44, may be manually shifted into mesh with a reverse idler gear on the opposite side of the transmission, not shown, and at the same time engage radial clutch teeth 46 and 47. A reverse idler gear, not shown, is permanently meshed with the countershaft gear 38. Since the overrunning clutch 44, transmits torque only in the forward direction the toothed clutch gear 47 was necessary in order to transmit torque in the reverse direction from the overrunning clutch gear 42 to the main driven shaft 10. Suitable shift control means 50, 51 and 52, as shown, are provided to enable the operator to position the slidable gear 42 for forward, neutral or reverse operation.

In the transmission shown the gear ratios and centrifugal clutch settings are such that the shift from low to high does not occur until the driving shaft speed has exceeded approximately 2400 R. P. M. The shift from high to low does not occur until engine speed has been reduced below 650 R. P. M. In reverse, the gear ratio is such that the high speed or transmission-driven clutch 8 does not try to engage until engine speed has exceeded approximately 3200 R. P. M., therefore the transmission can be operated in reverse without interference or drag from centrifugal clutch 8 with engine speeds up to about 3200 R. P. M.

From the foregoing disclosures it will now be apparent there has been disclosed a novel centrifugal clutch construction, and transmission automatically operated thereby which embodies, among other things, the objects and advantages of the invention first enumerated. It is not intended to be limited, however, to the specific embodiment of the invention shown, which was used merely for purposes of illustration, as many other formal modifications within the range of mechanical equivalents will now be suggested to those skilled in this art, and that are believed to come within the spirit and substance of the broad concept of the invention defined by the scope of the following claims.

What I claim is:

1. A centrifugally actuable clutch comprising in combination, a driving member, a plurality of friction elements moveable into and out of engagement with a torque transmitting drum, anchor means pivotally connected to diametrically opposed ends of each of said friction elements and to said driving member, toggle lever means comprising a rigid member and a resilient member pivotally connected to adjacent ends of each of said friction elements, and centrifugally displaceable weight means associated with said toggle lever means, said centrifugally displaceable weight means radially moveable under the action of centrifugal forces developed incidental to clutch operation to move said friction elements into engagement with said drum.

2. A centrifugally actuable clutch comprising in combination, a driving member, a plurality of friction elements moveable into and out of engagement with a torque transmitting drum, anchor means pivotally connected to diametrically opposed ends of each of said friction elements and to said driving member, toggle lever means pivotally connected to adjacent ends of each of said friction elements, centrifugally displaceable weight means associated with said toggle lever means, said centrifugally displaceable weight means radially moveable under the action of centrifugal forces developed incidental to clutch operation to move said friction elements into engagement with said drum, and spring means interposed between said centrifugally displaceable weight means and the anchored end of each of said friction elements for transmission under said centrifugal forces developed of predetermined pressures to said drum-engaging friction elements.

3. A centrifugally actuable clutch comprising in combination, a driving member, a plurality of friction elements moveable into and out of engagement with a torque transmitting drum, anchor means pivotally connected to diametrically opposed ends of each of said friction elements and to said driving member, toggle lever means pivotally connected to adjacent ends of each of said friction elements, centrifugally displaceable weight means associated with said toggle lever means, said centrifugally displaceable weight means radially moveable under the action of centrifugal forces developed incidental to clutch operation to move said friction elements into engagement with said drum, and stop means on said weight means engageable with a portion of said toggle lever means to limit displacement thereof by said developed centrifugal forces.

4. A centrifugally actuable clutch comprising in combination, a driving member, a plurality of friction elements moveable into and out of engagement with a torque transmitting drum, anchor means pivotally connected to diametrically opposed ends of each of said friction elements and to said driving member, toggle lever means pivotally connected to adjacent ends of each of said friction elements, centrifugally displaceable weight means associated with said toggle lever means, said centrifugally displaceable weight means radially moveable under the action of centrifugal forces developed incidental to clutch operation to move said friction elements into engagement with said drum, spring means interposed between said centrifugally displaceable weight means and the anchored end of each of said friction elements for transmission under said centrifugal forces developed of predetermined pressures to said drum-engaging friction elements, and stop means on said weight means engageable with a portion of said toggle lever means to limit displacement thereof by said developed centrifugal forces.

5. A centrifugally actuable clutch comprising in combination, a driving member, a plurality of friction elements moveable into and out of engagement with a torque transmitting drum, anchor means pivotally connected to diametrically opposed ends of each of said friction elements and to said driving member, toggle lever means pivotally connected to adjacent ends of each of said friction elements, centrifugally displaceable weight means associated with said toggle lever means, said centrifugally displaceable weight means radially moveable under the action of centrifugal forces developed incidental to clutch operation to move said friction elements into engagement with said drum, spring means interposed between said centrifugally displaceable weight means and the anchored end of each of said friction elements for transmission under said centrifugal forces developed of predetermined pressures to said drum-engaging friction elements, and return spring means stretched from a remote part of said friction elements to said weight means to effect replacement of the same in initial position upon removal of the centrifugal forces developed.

6. A centrifugally actuable clutch comprising in combination, a driving member, a plurality of friction elements moveable into and out of engagement with a torque transmitting drum, anchor means pivotally connected to diametrically opposed ends of each of said friction elements and to said driving member, toggle lever means pivotally connected to adjacent ends of each of said friction elements, centrifugally displaceable weight means associated with said toggle lever means, said centrifugally displaceable weight means radially moveable under the action of centrifugal forces developed incidental to clutch operation to move said friction elements into engagement with said drum, spring means interposed between said centrifugally displaceable weight means and the anchored end of each of said friction elements for transmission under said centrifugal forces developed of predetermined pressures to said drum-engaging friction elements, stop means on said weight means engageable with a portion of said toggle lever means to limit displacement thereof by said developed centrifugal forces, and said spring and stop means so arranged with respect to each other that in the limiting position of the stop means said spring means is thereafter effective to produce a predetermined maximum drum-engaging pressure of the friction elements.

7. A centrifugally actuable clutch comprising in combination, a driving member, a plurality of friction elements moveable into and out of engagement with a torque transmitting drum, anchor means pivotally connected to diametrically opposed ends of each of said friction elements and to said driving member, toggle lever means pivotally connected to adjacent ends of each of said friction elements, centrifugally displaceable weight means associated with said toggle lever means, said centrifugally displaceable weight means radially moveable under the action of centrifugal forces developed incidental to clutch operation to move said friction elements into engagement with said drum, and spring means interposed between said centrifugally displaceable weight means and the anchored end of each of said friction elements for transmission under said centrifugal forces developed of predetermined pressures to said drum-engaging friction elements, said spring means so arranged with respect to an open position of said toggle lever means as to retard disengagement of the friction elements and drum at predetermined speeds below the original engaging speed.

8. In the centrifugally actuable clutch as defined in claim 7, said spring means seated in each of said weight means and portions of the toggle lever means, operable with a direct force to retard disengagement of said friction elements and drum.

9. A centrifugally actuable clutch comprising in combination, a driving member, a plurality of friction elements moveable into and out of engagement with a torque transmitting drum, anchor means pivotally connected to diametrically opposed ends of each of said friction elements and to said driving member, toggle lever means pivotally connected to adjacent ends of each of said friction elements, centrifugally displaceable weight means associated with said toggle lever means, said centrifugally displaceable weight means radially moveable under the action of centrifugal forces developed incidental to clutch operation to move said friction elements into engagement with said drum, and stop means on said weight means engageable with a portion of said toggle lever means to limit displacement thereof by said developed centrifugal forces, whereby said weights are in dynamic balance at said limiting position.

ROBERT C. RUSSELL.